(12) United States Patent
Sone (10) Patent No.: US 9,702,754 B2
(45) Date of Patent: Jul. 11, 2017

(54) INSPECTION APPARATUS, AND ABNORMALITY DETECTION METHOD

(71) Applicant: KABUSHIKI KAISHA TOSHIBA, Minato-ku (JP)

(72) Inventor: Satoshi Sone, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 198 days.

(21) Appl. No.: 14/638,332

(22) Filed: Mar. 4, 2015

(65) Prior Publication Data

US 2015/0268092 A1   Sep. 24, 2015

(30) Foreign Application Priority Data

Mar. 19, 2014 (JP) ................................. 2014-056319

(51) Int. Cl.
*G01M 7/00* (2006.01)
*G01H 1/00* (2006.01)

(52) U.S. Cl.
CPC ............... *G01H 1/00* (2013.01); *G01M 7/00* (2013.01)

(58) Field of Classification Search
CPC .................................. G01H 1/00; G01M 7/00
USPC .......................................... 73/649, 598, 659
See application file for complete search history.

(56) References Cited

U.S. PATENT DOCUMENTS

| 4,366,544 A | * | 12/1982 | Shima | .................... | G01H 1/003 340/683 |
|---|---|---|---|---|---|
| 5,060,516 A | * | 10/1991 | Lau | ..................... | G01M 5/0058 73/579 |
| 5,696,324 A | * | 12/1997 | Tsuboi | ................... | G01N 29/12 73/579 |
| 2002/0183942 A1 | * | 12/2002 | Lafleur | ................... | G01M 7/00 702/56 |
| 2005/0049834 A1 | * | 3/2005 | Bottomfield | ....... | G05B 23/0229 702/183 |
| 2007/0044555 A1 | * | 3/2007 | Busch | ................ | G01M 13/025 73/471 |

(Continued)

FOREIGN PATENT DOCUMENTS

JP          03105229    *   5/1991
JP          06-300667 A     10/1994
(Continued)

*Primary Examiner* — J M Saint Surin
(74) *Attorney, Agent, or Firm* — Oblon, McClelland, Maier & Neustadt, L.L.P.

(57) ABSTRACT

In general, according to one embodiment, an inspection apparatus includes a disposition; a vibration detector configured to output a signal corresponding to vibration of the inspection object; a determination module configured to determine presence/absence of abnormality of the inspection object and configured to Fourier-transform an output result of the vibration detector at a time when the inspection object is disposed on the disposition section, to create vibration information indicative of vibration power of a characteristic frequency of each of structural elements of the disposition section, and to determine presence/absence of abnormality of the inspection apparatus, based on the vibration information; and a transmission module configured to transmit an output signal of the vibration detector to the determination module.

8 Claims, 7 Drawing Sheets

(56) References Cited

U.S. PATENT DOCUMENTS

| | | | | |
|---|---|---|---|---|
| 2010/0161254 A1* | 6/2010 | Atlas | ................ | G01H 1/00 |
| | | | | 702/56 |
| 2013/0231878 A1* | 9/2013 | Snyder | ................ | G01M 7/022 |
| | | | | 702/56 |
| 2015/0114121 A1* | 4/2015 | Takahashi | ............ | G01N 29/045 |
| | | | | 73/579 |
| 2015/0160071 A1* | 6/2015 | Kadosawa | ............ | G01H 11/08 |
| | | | | 73/658 |
| 2016/0202214 A1* | 7/2016 | Komiya | ................ | G01N 29/07 |
| | | | | 73/598 |

FOREIGN PATENT DOCUMENTS

| | | | |
|---|---|---|---|
| JP | 07-083952 A | | 3/1995 |
| JP | 2004-245633 A | | 9/2004 |
| JP | 2006072659 | * | 3/2006 |

* cited by examiner

INSPECTION APPARATUS, AND ABNORMALITY DETECTION METHOD

CROSS-REFERENCE TO RELATED APPLICATION

This application is based upon and claims the benefit of priority from Japanese Patent Application No. 2014-056319, filed Mar. 19, 2014; the entire contents of which are incorporated herein by reference.

FIELD

Embodiments described herein relate generally to an inspection apparatus which inspects an inspection object that is to be inspected, and an abnormality detection method for detecting abnormality of the inspection apparatus which inspects the inspection object.

BACKGROUND

For example, in an inspection step in a manufacturing process, a quality inspection is performed by using various sensors. By way of example, in an apparatus for detecting vibration, an acceleration sensor or the like is used, and an inspection of quality is performed based on detected vibration.

This kind of inspection apparatus includes a vibration detector, such as an acceleration sensor, which detects vibration generated by a product, a determination module which determines the presence/absence of abnormality, based on a detection result of the vibration detector, and a transmission line which transmits the detection result of the vibration detector to the determination module.

When abnormality is present in a product, for example, when a product including a rotary component has abnormality, the product generates abnormal vibration at a time of operation. If the vibration detector detects abnormal vibration, that is, if the vibration detector detects vibration which does not occur at a time of normal operation, the determination module determines that the product has abnormality.

On the other hand, when the vibration detector is faulty, even if the product generates abnormal vibration, the vibration detector cannot detect such vibration. Alternatively, when the transmission line is faulty, for example, when the transmission line is broken, the detection result of the vibration detector cannot be transmitted to the determination module. In this manner, even if the product generates abnormal vibration, if this abnormal vibration is not transmitted to the determination module, the determination module determines that the product is free of abnormality.

DETAILED DESCRIPTION

In general, according to one embodiment, an inspection apparatus includes a disposition section on which an inspection object to be inspected is disposed; a vibration detector configured to output a signal corresponding to vibration of the inspection object; a determination module configured to determine presence/absence of abnormality of the inspection object, based on an output result of the vibration detector, and configured to Fourier-transform an output result of the vibration detector at a time when the inspection object is disposed on the disposition section, to create vibration information indicative of vibration power of a characteristic frequency of each of structural elements of the disposition section, and to determine presence/absence of abnormality of the inspection apparatus, based on the vibration information; and a transmission module configured to transmit an output signal of the vibration detector to the determination module.

Figure 1:
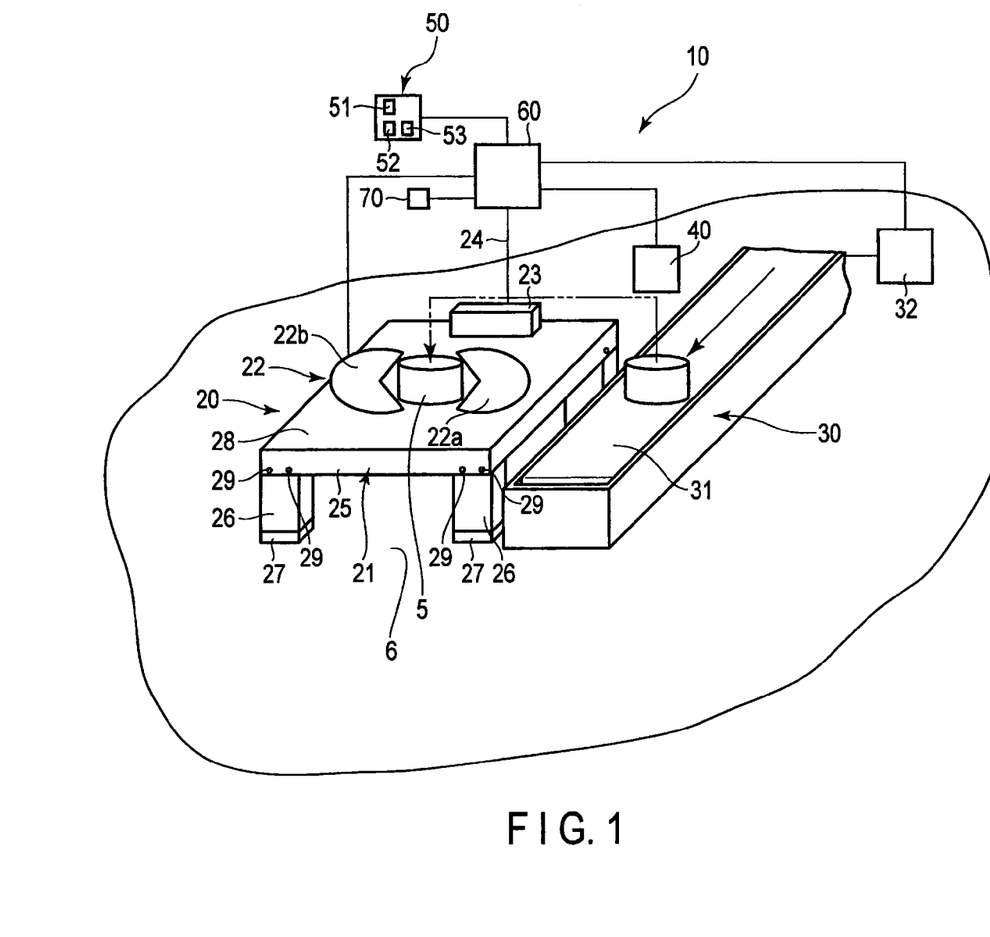
FIG. 1 is a perspective view illustrating an inspection apparatus according to a first embodiment.

An inspection apparatus and an abnormality detection method according to an embodiment will now be described with reference to FIG. 1 to FIG. 7. FIG. 1 is a perspective view illustrating an inspection apparatus 10 of the embodiment. The abnormality detection method of the embodiment is, for instance, a method of detecting abnormity of the inspection apparatus 10. The inspection apparatus 10 is configured to detect vibration which is generated by a product 5, which is an example of an inspection object that is to be inspected, at a time of operation, and to be able to determine the presence/absence of abnormality of the product 5, based on the detection result.

As illustrated in FIG. 1, the inspection apparatus 10 includes a vibration measuring device (disposition section) 20 on which the product 5 is disposed and which is configured to be able to measure vibration at a time of the operation of the product 5; a convey device 30 configured to be able to convey the product 5 to the vicinity of the vibration measuring device 20; a robot arm 40 configured to be able to move the product 5 from the convey device 30 to the vibration measuring device 20; an alarm device 50 including lamps configured to be able to be lighted; a control device (determination module) 60 configured to be able to execute various determinations, based on a signal from the vibration measuring device 20, and configured to be able to control the operations of the convey device 30, robot arm 40 and alarm device 50; and a memory module 70 storing information indicative of a state at a time of abnormality of the vibration measuring device 20.

The vibration measuring device 20 includes a vibration detection table 21 configured such that the product 5 can be placed thereon; a chuck device 22 provided on the vibration detection table 21 and configured to be able to fix the product 5 to the vibration detection table 21; a vibration detection sensor (vibration detector) 23 configured to be able to output a signal corresponding to vibration of the vibration detection table 21; and a transmission line (transmission module) 24 which transmits an output signal of the vibration detection sensor 23 to the control device 60.

The vibration detection table 21 includes a stage 25 including a disposition surface 28 on which the product 5 is disposed, a plurality of leg portions 26 which support the stage 25, and vibration insulation rubbers 27 provided between the leg portions 26 and the stage 25. The stage 25 includes the disposition surface 28 on which the product 5 is disposed. The leg portions 26 are coupled and fixed to the lower surface of the stage 25 by, for example, bolts 29. The bolts 29 are an example of fixing means for fixing the leg portions 26 to the stage 25.

The vibration insulation rubbers 27 are provided between a disposition surface 6 and the leg portions 26. The disposition surface 6 is a surface on which the vibration measuring device 20 is disposed. The vibration insulation rubbers 27 are in contact with the disposition surface 6 and the leg portions 26. The vibration insulation rubbers 27 are formed to be able to absorb vibration occurring from the disposition surface 6 toward the vibration detection table 21 and to prevent the vibration from being transmitted to the vibration detection table 21.

The chuck device 22 includes a first clamp portion 22a fixed to the stage 25, and a second clamp portion 22b which is supported on the disposition surface 28 so as to be movable relative to the first clamp portion 22a. The second clamp portion 22b is configured to be movable between a clamp position and a release position. The clamp position is such a position that the second clamp portion 22b can clamp the inspection object between itself and the first clamp portion 22a. The release position is such a position that the second clamp portion 22b is at a greater distance from the first clamp portion 22a than in the clamp position and that the clamping of the inspection object between the first clamp portion 22a and the second clamp portion 22b is released.

The vibration detection sensor 23 is provided on the disposition surface 28. The vibration detection sensor 23 is, for instance, an acceleration sensor, and is configured to be able to detect vibration of the vibration detection table 21 and to be able to output a signal corresponding to the vibration.

The transmission line 24 is configured to be able to transmit an output signal of the vibration detection sensor 23 to the control device 60. The convey device 30 includes an endless convey belt 31 on which the product 5 is placed, and a driving device 32 configured to be able to rotate the convey belt 31 in its circumferential direction. The driving device 32 is, for example, an electric motor.

The robot arm 40 is configured to be able to hold the product 5 on the convey belt 31, and to be able to move the held product 5 to a production disposition position which is set on the disposition surface 28 of the vibration detection table 21.

The alarm device 50 includes a first lamp 51 configured such that the first lamp 51 can be turned on when abnormality is present in the vibration detection sensor 23 or transmission line 24, a second lamp 52 configured such that the second lamp 52 can be turned on when abnormality is present in the leg portion 26, and a third lamp 53 configured such that the third lamp 53 can be turned on when abnormality is present in the second clamp portion 22b.

The control device 60 is configured to be able to drive the driving device 32 of the convey device 30, the second clamp portion 22b of the chuck device 22, and the robot arm 40. In addition, the control device 60 is configured to be able to determine the presence/absence of abnormality of the product 5, based on an output result of the vibration detection sensor 23 due to the operation of the product 5 disposed on the disposition surface 28.

In addition, the control device 60 is configured to be able to determine the presence/absence of abnormality of the vibration detection sensor 23 or transmission line 24, based on the output result of the vibration detection sensor 23. Specifically, the control device 60 is configured to be able to create vibration information indicative of vibration power of the characteristic frequency of the structural elements of the vibration measuring device 20, by performing Fourier transform of the output signal of the vibration detection sensor 23.

In the vibration information, the vibration power takes a peak at the characteristic frequency of each structural element of the vibration measuring device 20. This characteristic frequency is a characteristic frequency of each structural element in the state in which the structural elements are constructed as the vibration measuring device 20, and is not a characteristic frequency of each structural element in the disassembled state.

In the meantime, the vibration information illustrated in FIG. 5, which will be described later, is illustrated such that the vibration power takes peaks at characteristic frequencies of the leg portion 26 and second clamp portion 22b which are represented as examples of the structural elements of the vibration measuring device 20.

The control device 60 compares the vibration power, which is indicated by the vibration information, and a threshold to be described later, and determines, based on the comparison result, the presence/absence of abnormality of the vibration detection sensor 23 or transmission line 24.

In addition, the control device 60 is configured to be able to determine the presence/absence of abnormality of the leg portion 26 and second clamp portion 22b.

The determination of the presence/absence of abnormality of the leg portion 26 will now be concretely described. A state in which the leg portion 26 is in the best condition is set to be "reference normal state" of the leg portion 26. The reference normal state of the leg portion 26 is a state in which there is no abnormality in the leg portion 26 itself and the leg portion 26 is fixed to the stage 25 in the best condition.

A characteristic frequency a of the leg portion 26 in the reference normal state can be obtained in advance by experiments, etc. Incidentally, the characteristic frequency a is a characteristic frequency in a state in which the leg portion 26 is assembled to the stage 25.

The control device 60 is configured to compare a first tolerable range C, which is set for the characteristic frequency a in the reference normal state, and an actual characteristic frequency of the leg portion 26, which is obtained from the vibration information, and to be able to determine, based on the comparison result, the presence/absence of abnormality of the leg portion 26.

The first tolerable range C is a range of a frequency a1 or more and a frequency a2 or less. That the characteristic frequency of the leg portion 26 is within the first tolerable range C means that the state of the leg portion 26 is a state in which no problem arises with the capability of the vibration measuring device 20. In other words, this means that the leg portion 26 itself is normal in such a degree that no problem arises with the capability of the vibration measuring device 20, and that the fixation of the leg portion 26 to the stage 25 is normal in such a degree that no problem arises with the capability of the vibration measuring device 20. The first tolerable range C can be obtained by experiments.

The determination of the presence/absence of abnormality of the second clamp portion 22b will now be concretely described. A state in which the second clamp portion 22b is in the best condition is set to be "reference normal state" of the second clamp portion 22b. The reference normal state of the second clamp portion 22b is a state in which there is no abnormality in the second clamp portion 22b itself and the second clamp portion 22b is supported to the stage 25 in the best condition. A characteristic frequency b of the second clamp portion 22b in the reference normal state can be obtained in advance by experiments, etc.

The control device 60 is configured to compare a second tolerable range D, which is set for the characteristic frequency b in the reference normal state, and an actual characteristic frequency of the second clamp portion 22b, which is obtained from the vibration information, and to be able to determine, based on the comparison result, the presence/absence of abnormality of the second clamp portion 22b.

The second tolerable range D is a range of a frequency b1 or more and a frequency b2 or less. That the characteristic frequency of the second clamp portion 22b is within the second tolerable range D means that the state of the second clamp portion 22b is a state in which no problem arises with the capability of the vibration measuring device 20. In other words, this means that the second clamp portion 22b itself is normal in such a degree that no problem arises with the capability of the vibration measuring device 20, and that the support of the second clamp portion 22b on the stage 25 is normal in such a degree that no problem arises with the capability of the vibration measuring device 20. The second tolerable range D can be obtained by experiments.

The memory module 70 includes information of a threshold T which is used at a time of determining abnormality of the vibration detection sensor 23 or the transmission line 24, information of the characteristic frequency $a$ of the leg portion 26 in the reference normal state, information of the characteristic frequency $b$ of the second clamp portion 22b in the reference normal state, information of the first tolerable range C, and information of the second tolerable range D.

Figure 2:
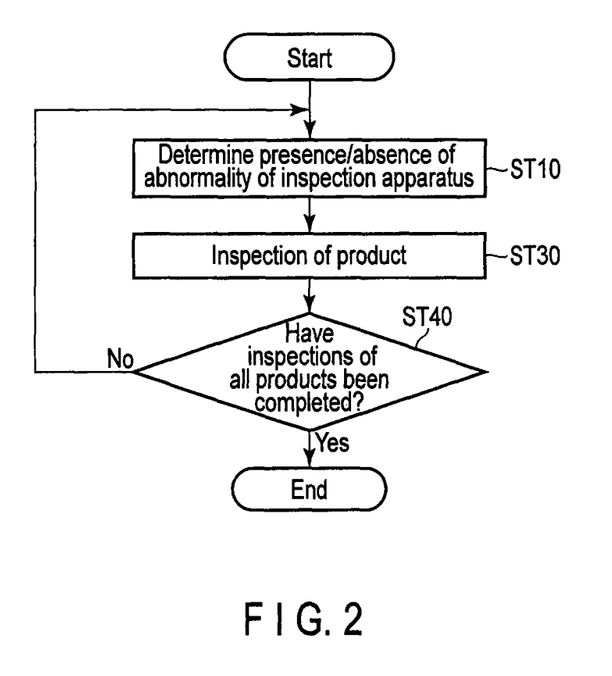
FIG. 2 is a flowchart illustrating an operation of the inspection apparatus.

Next, the operation of the inspection apparatus 10 is described. FIG. 2 is a flowchart illustrating the operation of the inspection apparatus 10. As illustrated in FIG. 2, if a switch for starting the operation is operated by, for example, an operator, the process advances to step ST10. In step ST10, the presence/absence of abnormality of the inspection apparatus 10 is determined. Step ST10 will concretely be described later. If there is no abnormality in the vibration measuring device 20, the process advances to step ST30. In step ST30, the inspection apparatus 10 determines the presence/absence of abnormality of the product 5, based on the output result of the vibration detection sensor 23 at a time of the operation of the product 5.

If the product 5 has been inspected in step ST30, the process advances to step ST40. In step ST40, the control device 60 determines whether the inspections of all products 5 have been completed. If the inspections of all products 5 have been completed, the operation of the inspection apparatus 10 is stopped. If there is a non-inspected product 5, the process returns to step ST10.

Next, step ST10 is concretely described. To begin with, a description is given of the operation in step ST10 in the state in which the vibration measuring device 20 is in the best condition. Since the vibration measuring device 20 is in the best condition, the leg portions 26 are in the reference normal state and the second clamp portion 22b is in the reference normal state. Incidentally, in step ST10, the control device 60 uses, where necessary, the information stored in the memory module 70 at a time of executing various comparisons.

Figure 3:
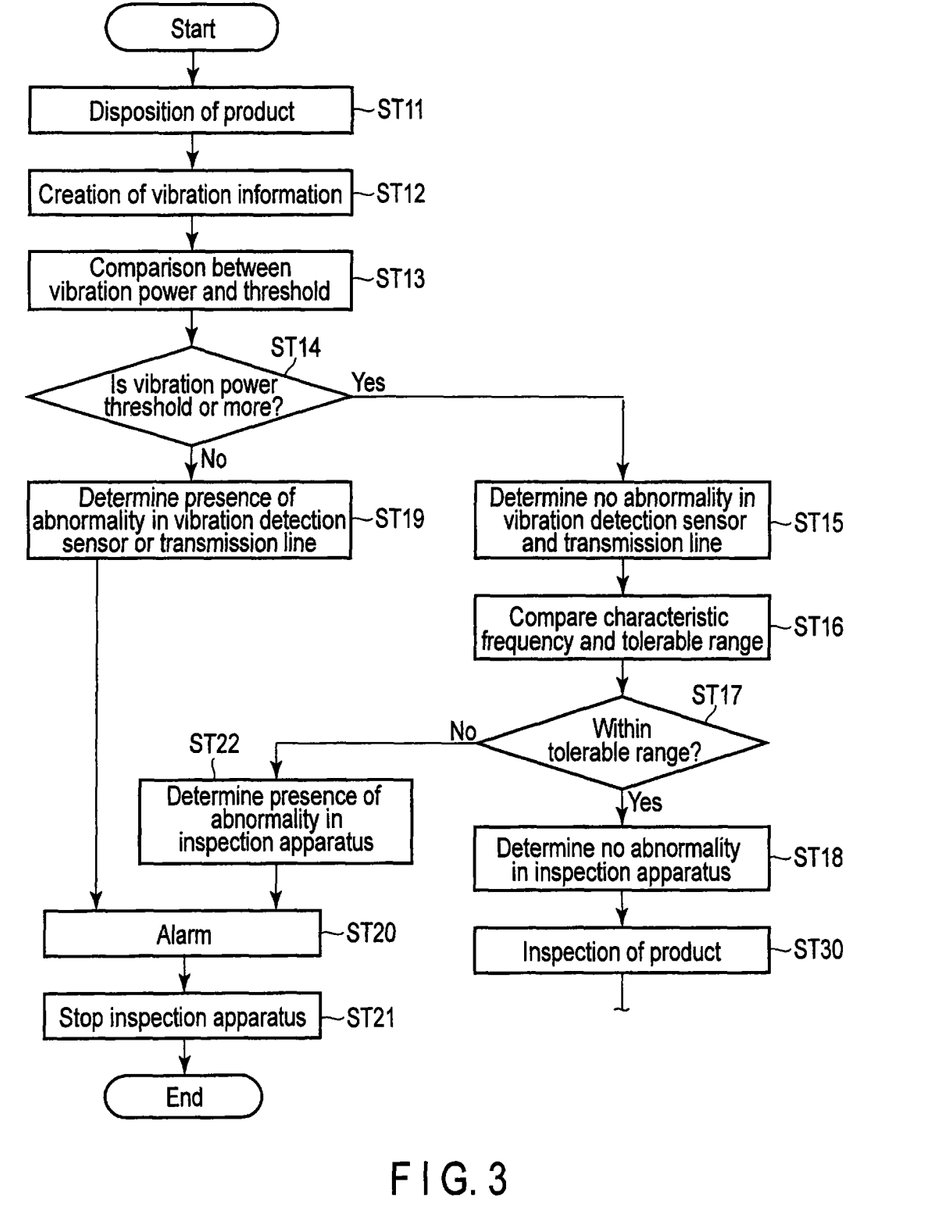
FIG. 3 is a flowchart which specifically illustrates step ST10 of the flowchart.

FIG. 3 is a flowchart which specifically illustrates step ST10. As illustrated in FIG. 3, if the switch for starting the operation is operated by the operator, the convey device 30 and robot arm 40 enter an operable state. In addition, the vibration detection sensor 23 enters an operable state. Thus, if the vibration detection table 21 vibrates, the vibration detection sensor 23 outputs a signal corresponding to the vibration. Next, the process advances to step ST11.

In step ST11, the product 5 is disposed at a position of disposition on the disposition surface 28 of the vibration detection table 21. The position of disposition is a position where the product 5 is disposed on the disposition surface 28, and is preset. In the state in which the product 5 is placed at the position of disposition, the second clamp portion 22b moves to the clamp position, and thereby the product 5 is clamped between the clamp portions 22a, 22b.

Specifically, in step ST11, the control device 60 controls the driving device 32 of the convey device 30, thereby rotating the convey belt 31 and conveying the product 5, which is placed on the convey belt 31, to the vicinity of the vibration detection table 21. If the product 5 is conveyed to the vicinity of the vibration detection table 21, the control device 60 stops the operation of the driving device 32 of the convey device 30. Next, the control device 60 drives the robot arm 40, and moves the product 5 on the convey belt 31 to the position of disposition on the disposition surface 28 of the vibration detection table 21.

In the meantime, the vibration detection table 21 vibrates due to an impact at a time when the product 5 was placed on the position of disposition of the disposition surface 28. The vibration detection sensor 23 outputs a signal corresponding to this vibration of the vibration detection table 21. The output signal is sent to the control device 60 via the transmission line 24.

If the product 5 has been moved onto the position of disposition on the disposition surface 28, the control device 60 moves the second clamp portion 22b from the release position to the clamp position. By the movement of the second clamp portion 22b to the clamp position, the product 5 is clamped between the clamp portions 22a and 22b and is thereby fixed at the position of disposition on the disposition surface 28.

The vibration detection table 21 vibrates due to an impact at a time when the product 5 was clamped between the clamp portions 22a and 22b. The vibration detection sensor 23 outputs a signal corresponding to the vibration of the vibration detection table 21 at this time. This signal is sent to the control device 60 via the transmission line 24.

The control device 60 specifies the signal, which has been sent from the vibration detection sensor 23 after transmitting the control signal to the second clamp portion 22b so that the second clamp portion 22b moves from the release position to the clamp position, as a signal corresponding to the vibration of the vibration detection table 21 due to the impact at the time when the product 5 was clamped between the clamp portions 22a and 22b. Next, the process advances to step ST12.

In step ST12, if the control device 60 receives the signal corresponding to the vibration of the vibration detection table 21 due to the impact at the time when the product 5 was clamped between the clamp portions 22a and 22b, that is, if the control device 60 receives the signal from the vibration detection sensor 23 after sending the control signal to the second clamp portion 22b so that the second clamp portion 22b moves from the release position to the clamp position, the control device 60 Fourier-transforms this signal and creates vibration information I.

Figure 4:
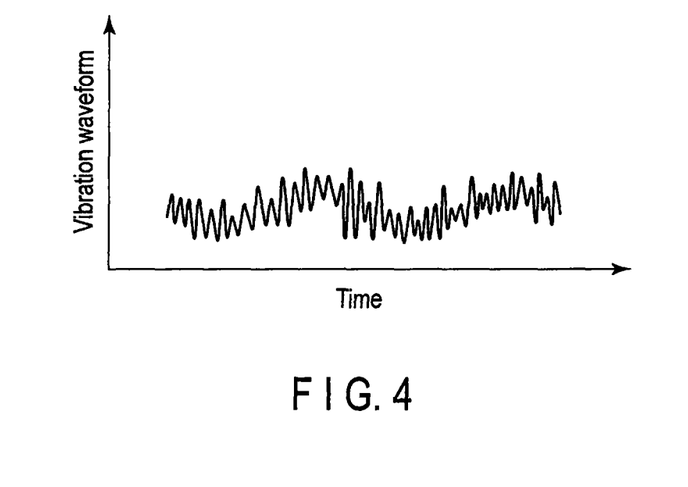
FIG. 4 is a graph illustrating a signal which has been output by a vibration detection sensor, after a control device of the inspection apparatus transmitted a control signal to a second clamp portion so that the second clamp portion moves from a release position to a clamp position.

FIG. 4 is a graph illustrating a signal which has been output by the vibration detection sensor 23, after the control device 60 transmitted the control signal to the second clamp portion 22b so that the second clamp portion moves from the release position to the clamp position. The abscissa of FIG. 4 indicates time. The abscissa indicates that time has passed in a direction toward the right side in FIG. 4. The ordinates indicates a vibration waveform.

Figure 5:
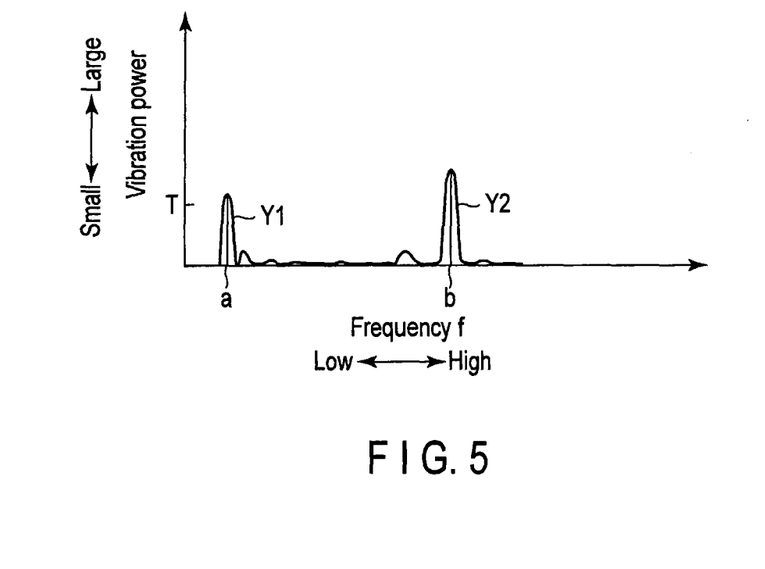
FIG. 5 is a graph illustrating vibration information.

FIG. 5 is a graph illustrating vibration information I. In FIG. 5, the abscissa indicates a frequency. The abscissa indicates that the frequency increases in a direction toward the right side in FIG. 5. In FIG. 5, the ordinate indicates vibration power. The ordinate indicates that the vibration power increases in a direction toward the upper side in FIG. 5. FIG. 5 indicates vibration information I in a case where the leg portions 26 are in the reference normal state and the second clamp portion 22b is in the reference normal state.

As illustrated in FIG. 5, the vibration information I is indicative of the vibration power of each of frequency components included in the signal illustrated in FIG. 4. The product 5 is not in operation in the state after the control signal was transmitted from the control device 60 to the second clamp portion 22b so that the second clamp portion moves from the release position to the clamp position. Accordingly, the signal is a signal corresponding to the vibration of an integral body composed of the vibration detection table 21 and product 5 due to the impact at the time when the product 5 was clamped between the clamp portions 22a and 22b.

As has been described above, the vibration information I has such a property that the vibration power of the characteristic frequency of each of the elements constituting the vibration measuring device 20 increases. In the present embodiment, in the vibration information I, the second clamp portion 22b and leg portion 26 are representatively shown. Therefore, peaks of vibration power appear at the characteristic frequency a of the leg 26 in the reference normal state and at the characteristic frequency b of the second clamp portion 22b in the reference normal state. If the vibration information I is created, the process advances to step ST13.

In step ST13, the control device 60 compares the vibration power, which is indicated by the vibration information I created in step ST12, and the threshold T stored in the memory module 70. Next, the process advances to step ST14.

In step ST14, the control device 60 determines whether the vibration power is the threshold T or more, in the comparison result in step ST13. In the present embodiment, the vibration power indicated by the vibration information I shown in FIG. 5 takes a peak at each of the frequencies a and b. In addition, the vibration power is greater than the threshold T in a range sandwiching each frequency a, b. Thus, the control device 60 determines that the vibration power is higher than the threshold T in the neighborhood of each frequency a, b. When the vibration power is the threshold T or more, the process advances to step ST15.

In step ST15, the control device 60 determines that no abnormality is present in the vibration detection sensor 23 and the transmission line 24. Specifically, since the vibration power of the vibration information I, which is obtained by the Fourier-transform of the output of the vibration detection sensor 23, is the threshold T or more, it is indicated that the vibration has been exactly detected by the vibration detection sensor 23 and the signal output by the vibration detection sensor 23 has been exactly transmitted to the control device 60 by the transmission line 24. Next, the process advances to step ST16.

Figure 6:
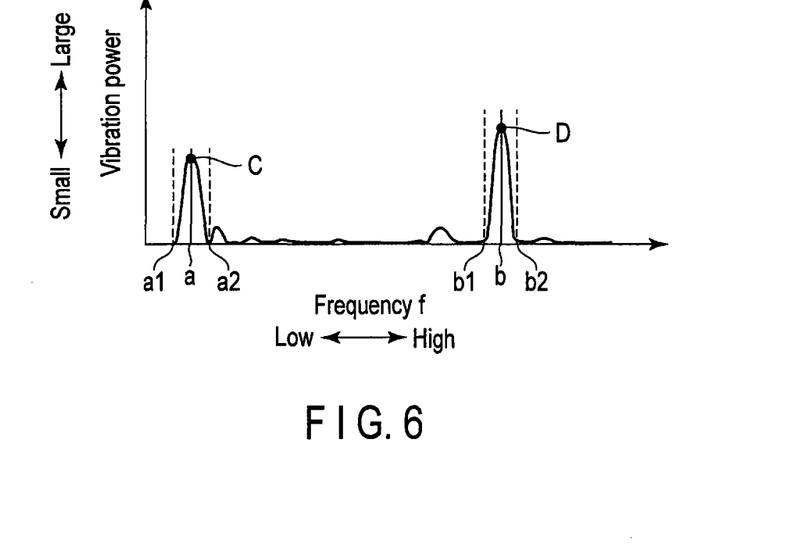
FIG. 6 is a graph illustrating a state in which the vibration information and a first tolerable range and a second tolerable range are compared.

In step ST16, the control device 60 compares the characteristic frequency of the leg portion 26 and the first tolerable range C, and compares the characteristic frequency of the second clamp portion 22b and the second tolerable range D. FIG. 6 is a graph illustrating a state in which the vibration information I shown in FIG. 5, that is, the vibration information I in which the second clamp portion 22b is in the reference normal state and the leg portion 26 is in the reference normal state, and the tolerable ranges C, D, are compared.

Incidentally, as described above, the characteristic frequency of the leg portion 26 varies depending on the state of the leg portion 26. However, even in a case where abnormality occurs in the leg portion 26, the characteristic frequency of the leg portion 26 does not greatly deviate from the characteristic frequency a in the reference normal state. The reason for this is that the leg portions 26, which cleared the standard of quality, are used.

Thus, the control device 60 specifies the frequency a, or a peak of a crest having this peak in the neighborhood of the frequency a, as the actual characteristic frequency of the leg portion 26. In the vibration information I, the peak of a crest Y1 indicated by the vibration power is the frequency a. Thus, the control device 60 specifies the frequency a, which is the peak of the crest Y1 indicated by the vibration information I, as the characteristic frequency of the leg portion 26. Incidentally, in this description, since the leg portion 26 is in the reference normal state, the characteristic frequency of the leg portion 26 is a. As illustrated in FIG. 6, the frequency a falls within the first tolerable range C.

Similarly, the characteristic frequency of the second clamp portion 22b varies depending on the state of the second clamp portion 22b. However, even in a case where abnormality occurs in the second clamp portion 22b, the characteristic frequency of the second clamp portion 22b does not greatly deviate from the characteristic frequency b in the reference normal state. The reason for this is that the second clamp portion 22b, which cleared the standard of quality, is used.

Thus, the control device 60 specifies the frequency b, or a peak of a crest having this peak in the neighborhood of the frequency b, as the actual characteristic frequency of the second clamp portion 22b. In the vibration information I, the peak of a crest Y2 indicated by the vibration power is the frequency b. Thus, the control device 60 specifies the frequency b, which is the peak of the crest Y2 indicated by the vibration information I, as the characteristic frequency of the second clamp portion 22b. Incidentally, in this description, since the second clamp portion 22b is in the reference normal state, the characteristic frequency of the second clamp portion 22b is b. As illustrated in FIG. 6, the frequency b falls within the second tolerable range D. Next, the process advances to step ST17.

In step ST17, it is determined whether the characteristic frequency of the leg portion 26 is within the first tolerable range C and the characteristic frequency of the second clamp portion 22b is within the second tolerable range D. In this description, since the characteristic frequency a of the leg portion 26 is within the first tolerable range C and the characteristic frequency b of the second clamp portion 22b is within the second tolerable range D, the control device 60 determines that the characteristic frequency a of the leg portion 26 is within the first tolerable range C and the characteristic frequency b of the second clamp portion 22*b* is within the second tolerable range D. Next, the process advances to step ST18.

In step ST18, the control device 60 determines that there is no abnormality in the leg portion 26 and second clamp portion 22*b*. Next, the process advances to step ST30.

This description has been given of the case in which the leg portion 26 is in the reference normal state and the second clamp portion 22*b* is in the reference normal state. For example, even in the case where the leg portion 26 is not in the reference normal state, that is, even in the case where the characteristic frequency of the leg portion 26 deviates from a, if the characteristic frequency of the leg portion 26 is within the first tolerable range C, the control device 60 determines that the leg portion 26 is normal.

Similarly, even in the case where the second clamp portion 22*b* is not in the reference normal state, that is, even in the case where the characteristic frequency of the second clamp portion 22*b* deviates from b, if the characteristic frequency of the second clamp portion 22*b* is within the second tolerable range D, the control device 60 determines that the second clamp portion 22*b* is normal.

Next, a description is given of the operation in the case where there is abnormality in the vibration detection sensor 23 or transmission line 24.

In step ST14, if the vibration power of the vibration information is less than the threshold T, the process goes to step ST19. In step ST19, the control device 60 determines that there is abnormality in the vibration detection sensor 23 or transmission line 24. Specifically, that the vibration power is less than the threshold T means that the vibration detection sensor 23 is in the state in which the vibration detection sensor 23 cannot exactly output a signal corresponding to vibration, or that the transmission line 24 is in the state in which the transmission line 24 cannot exactly transmit the output of the vibration detection sensor 23 to the control device 60.

Figure 7:
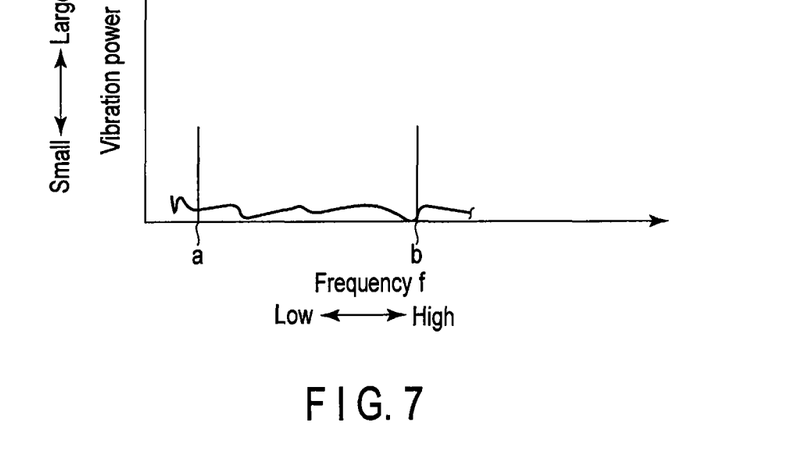
FIG. 7 is a graph illustrating vibration information in a case where abnormality is present in the vibration detection sensor or in a transmission line of the inspection apparatus.

FIG. 7 is a graph illustrating the vibration information I created by the control device 60 in a case where the vibration detection sensor 23 fails to exactly output a signal corresponding to a shake of the vibration detection table 21, or in a case where the transmission line 24 fails to exactly transmit the output of the vibration detection sensor 23 to the control device 60. The abscissa and ordinate of FIG. 7 are the same as those of FIG. 5. As illustrated in FIG. 7, when there is abnormality in the vibration detection sensor 23 or transmission line 24, the vibration power indicated by the vibration information I is small as a whole.

The state in which abnormality is present in the vibration detection sensor 23, or the state in which abnormality is present in the transmission line 24, includes, for example, at least one of a state in which abnormality is present in the vibration detection sensor 23 itself, a state in which there is abnormality in the fixation of the vibration detection sensor 23 to the stage 25, and a state in which the transmission line 24 is broken. Next, the process advances to step ST20.

In step ST20, the control device 60 transmits a signal to the alarm device 50, thereby to turn on the first lamp 51 which gives an alarm on the abnormality of the vibration detection sensor 23 or transmission line 24. With the first lamp 51 being turned on, the operator can recognize that abnormality is present in the vibration detection sensor 23 or transmission line 24.

Next, the control device 60 stops the operation of the inspection apparatus 10. In the meantime, when the operation of the inspection apparatus 10 is to be stopped, the operation of the inspection apparatus 10 may be automatically stopped after the first lamp 51 is lighted for a predetermined time, or the operation of the inspection apparatus 10 may be stopped by the operator operating a switch or the like to stop the operation of the inspection apparatus 10. In this case, the first lamp 51 may be lighted until the operator operates the switch or the like to stop the operation of the inspection apparatus 10. Since the operation of the inspection apparatus 10 is stopped, the operation in step ST30 is not performed.

Next, a description is given of the case in which there is abnormality in the leg portion 26 or second clamp portion 22*b*. If the control device 60 determines in step ST17 that the characteristic frequency of the leg portion 26 in the state in which the product 5 is placed on the stage 25 and clamped between the clamp portions 22*a* and 22*b* is less than the first tolerable range C or is greater than the first tolerable range C, the control device 60 goes to step S22. In step ST22, the control device 60 determines that abnormality is present in the leg portion 26. Next, the process advances to step ST20.

In step ST20, the control device 60 transmits a signal for turning on the second lamp 52 to the alarm device 50, thereby to turn on the second lamp 52 which indicates the presence of abnormality of the leg portion 26. Next, the process advances to step ST21.

Similarly, if the control device 60 determines that the characteristic frequency of the second clamp portion 22*b* in the state in which the product 5 is placed on the disposition surface 28 and clamped between the clamp portions 22*a* and 22*b* is less than the second tolerable range D or is greater than the second tolerable range D, the control device 60 goes to step S22.

In step ST22, the control device 60 determines that abnormality is present in the second clamp portion 22*b*. Next, the process advances to step ST20.

In step ST20, the control device 60 transmits a signal for turning on the third lamp 53 to the alarm device 50, thereby to turn on the third lamp 53 which indicates the presence of abnormality of the second clamp portion 22*b*. Next, the process advances to step ST21.

In the meantime, when abnormality is present in the leg portion 26 and the second clamp portion 22*b*, the control device 60 transmits, in step ST20, signals for turning on the lamps 52, 53 to the alarm device 50, thereby to turn on the lamps 52, 53.

In the inspection apparatus 10 with the above-described structure, since the presence/absence of abnormality of the vibration measuring device 20 is determined by making use of vibration occurring when the product 5 is disposed on the disposition surface 28, there is no need to additionally provide a device for vibrating the vibration measuring device 20. In other words, since the presence/absence of abnormality of the vibration detection sensor 23 or transmission line 24 can be determined without altering the structure of the existing vibration measuring device 20, it is possible to suppress an increase in cost and to enhance the reliability of the detection precision of the inspection apparatus 10.

In addition, based on the result of comparison between the vibration power of the vibration information I and the threshold T, the presence/absence of abnormality of the vibration detection sensor 23 or transmission line 24 can be determined, while an increase in cost is suppressed.

Furthermore, by comparing the characteristic frequency of the leg portion 26 and the first tolerable range C, the presence/absence of abnormality of the leg portion 26 can be determined, while an increase in cost is suppressed. Similarly, by comparing the characteristic frequency of the second clamp portion 22b and the second tolerable range D, the presence/absence of abnormality of the second clamp portion 22b can be determined, while an increase in cost is suppressed.

Besides, the control device 60 executes the creation of vibration information, the determination of the presence/absence of abnormality of the vibration detection sensor 23 or transmission line 24, the determination of the presence/absence of abnormality of the leg portion 26, and the determination of the presence/absence of abnormality of the second clamp portion 22b. Therefore, since determination modules for executing various determinations can be integrated into one determination module, an increase in cost of the inspection apparatus 10 can be prevented and the inspection apparatus 10 can be made compact.

Next, an abnormality detection method according to a second embodiment is described with reference to FIG. 8 and FIG. 9. Incidentally, the structures having the same functions as in the first embodiment are denoted by the same reference numerals, and a description thereof is omitted. In this embodiment, the alarm device 50, control device 60 and memory module 70 are different from those in the first embodiment. In the other respects, the second embodiment is the same as the first embodiment. The above different points will be concretely described.

Figure 8:
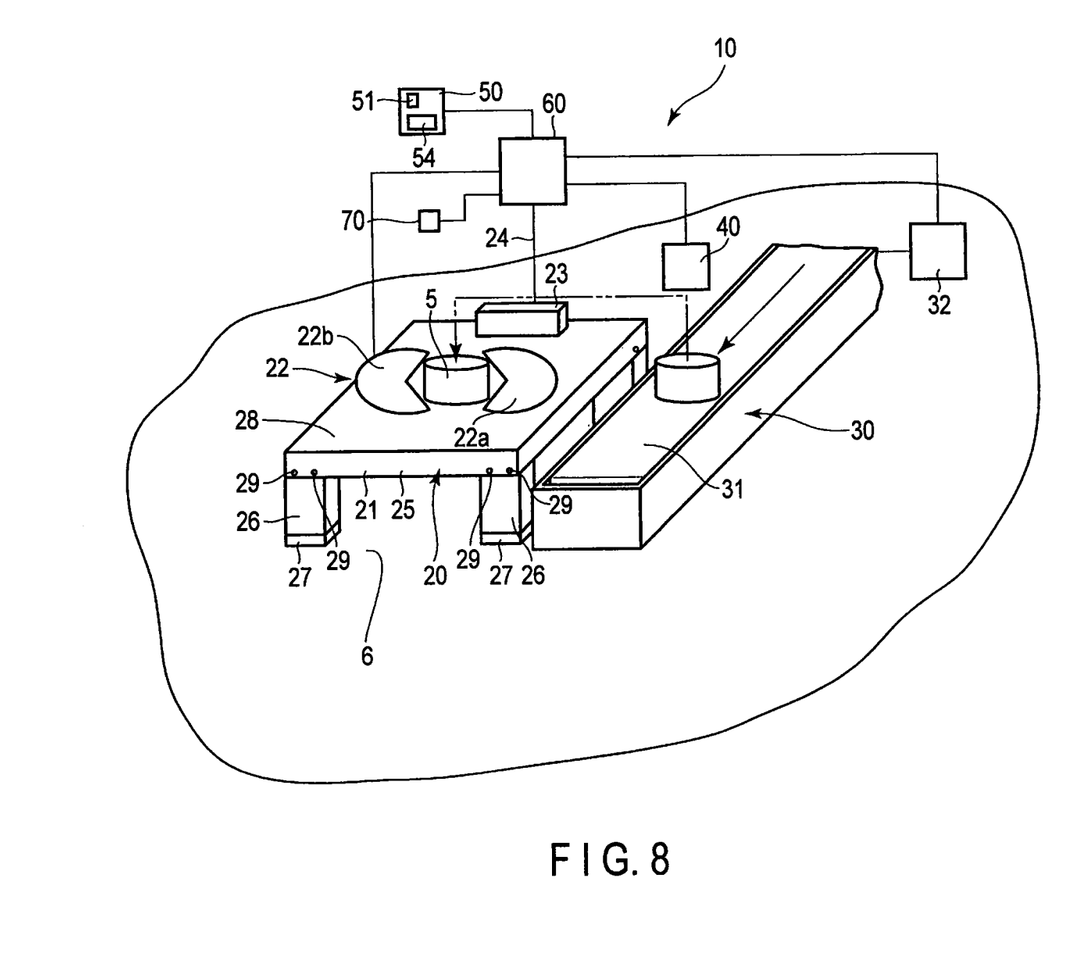
FIG. 8 is a perspective view illustrating an inspection apparatus according to a second embodiment.

FIG. 8 is a perspective view illustrating an inspection apparatus 10 according to this embodiment. As illustrated in FIG. 8, the alarm device 50 includes a display module 54 which displays the kind of abnormality, in place of the lamps 52 and 53.

The memory module 70 includes, in addition to the information of the threshold T, the information of the first tolerable range C and the information of the second tolerable range D, information indicative of the kind of abnormality corresponding to a deviation of the characteristic frequency of each structural element relative to these tolerable ranges. The relationship between the deviation of the characteristic frequency relative to the tolerable ranges and the kind of abnormality will be concretely described.

In the present embodiment, if the characteristic frequency of the leg portion 26 in the state in which the product 5 is placed on the disposition surface 28 and clamped between the clamp portions 22a and 22b is less than the first tolerable range C, it is indicated that abnormality is present in the leg portion 26 due to the application of external force to the leg portion 26.

In addition, if the characteristic frequency of the leg portion 26 in the state in which the product 5 is placed on the disposition surface 28 and clamped between the clamp portions 22a and 22b is greater than the first tolerable range C, it is indicated that abnormality is present in the fixation of the leg portion 26 to the stage 25.

The relationship between the deviation of the characteristic frequency relative to the first tolerable range C and the kind of abnormality can be obtained by experiments. Incidentally, the relation of the deviation of the characteristic frequency of the leg portion 26 to the first tolerable range C, which has been described above, is merely an example.

Similarly, if the characteristic frequency of the second clamp portion 22b in the state in which the product 5 is placed on the disposition surface 28 and clamped between the clamp portions 22a and 22b is less than the second tolerable range D, it is indicated that abnormality is present in the second clamp portion 22b due to the application of external force to the second clamp portion 22b. In addition, if the characteristic frequency of the second clamp portion 22b in the state in which the product 5 is placed on the disposition surface 28 and clamped between the clamp portions 22a and 22b is greater than the second tolerable range D, it is indicated that abnormality is present in the fixation of the second clamp portion 22b to the stage 25.

The relationship between the deviation of the characteristic frequency relative to the second tolerable range D and the kind of abnormality can be obtained by experiments. Incidentally, the relation of the deviation of the characteristic frequency of the second clamp portion 22b to the second tolerable range D, which has been described above, is merely an example.

Figure 9:
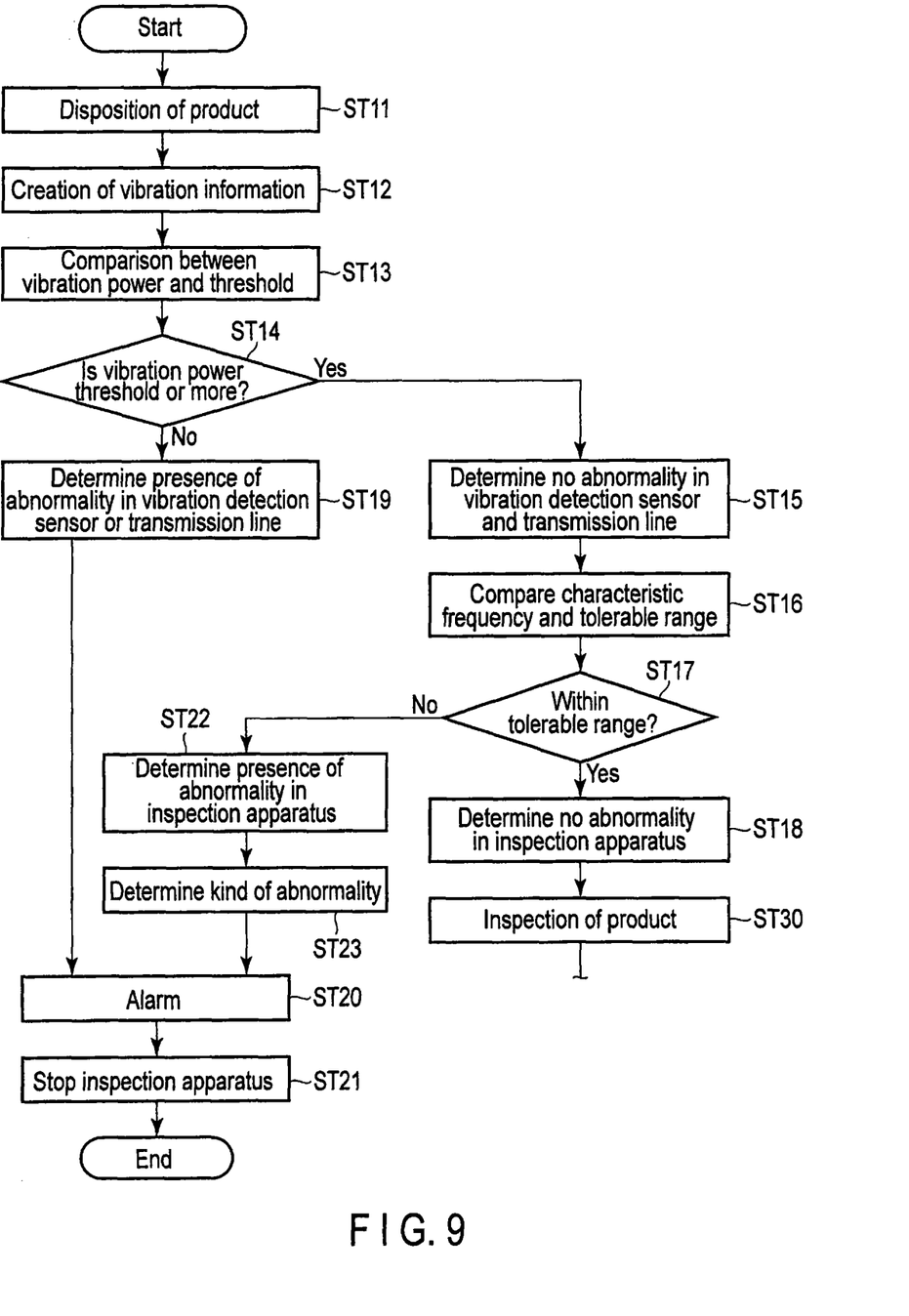
FIG. 9 is a flowchart illustrating step ST10 of the flowchart of the operation of the inspection apparatus.

FIG. 9 is a flowchart illustrating the operation of the control device 60 of the present embodiment. As illustrated in FIG. 9, in this embodiment, the control device 60 executes the operation of step ST23 between step ST22 and step ST20. The other operation is the same as in the first embodiment.

In step ST23, when abnormality is present in the leg portion 26, the control device 60 determines, based on the information stored in the memory module 70, the kind of abnormality corresponding to the deviation of the characteristic frequency of the leg portion 26 relative to the first tolerable range C. In addition, when abnormality is present in the second clamp portion 22b, the control device 60 determines, based on the information stored in the memory module 70, the kind of abnormality corresponding to the deviation of the characteristic frequency of the second clamp portion 22b relative to the second tolerable range D. Then, the control device 60 transmits a signal to the alarm device 50, thereby to display the kind of abnormality by the display module 54. Next, the process advances to step 21.

In the inspection apparatus with this structure, in addition to the advantageous effects of the first embodiment, it is possible to determine the kind of abnormality of the leg portion 26, based on the deviation of the characteristic frequency of the leg portion 26 relative to the first tolerable range C, while an increase in cost is suppressed. Similarly, it is possible to determine the kind of abnormality of the second clamp portion 22b, based on the deviation of the characteristic frequency of the second clamp portion 22b relative to the second tolerable range D, while an increase in cost is suppressed.

Incidentally, in the first and second embodiments, as the vibration at the time when the product 5 is disposed on the disposition surface 28, use is made of, for example, the vibration at the time when the product 5 is clamped between the clamp portions 22a and 22b. In this manner, use is made of the vibration occurring due to the operation of the fixing device for fixing the product 5 on the disposition surface 28. The chuck device is an example of the fixing device. In another example, use may be made of, for instance, vibration at a time when the product 5 is placed on the disposition surface 28.

As in the embodiments, by using the signal of the vibration detection sensor 23 after the driving signal was sent to the second clamp portion 22b of the chuck device 22 that is an example of the fixing device, this signal can be specified as the signal corresponding to the vibration due to the operation of the chuck device 22. Specifically, the signal at the time of the operation of the chuck device 22 can easily be specified from the signals which are output from the vibration detection sensor 23.

In addition, in the first and second embodiments, the presence/absence of abnormality of the leg portion 26 and second clamp portion 22b, among the structural elements of the vibration measuring device 20, is determined by way of example. The the leg portion 26 and second clamp portion 22b are examples of the structural elements of the vibration measuring device 20. The structural element of the vibration measuring device 20, the presence/absence of abnormality of which is to be determined, can be arbitrarily chosen. For example, the abnormality of the structural element, which greatly affects the capability of the vibration measuring device 20, may be detected.

Besides, in the second embodiment, as the deviations of the characteristic frequencies of the leg portion 26 and second clamp portion 22b relative to the tolerable ranges C, D, the case of less than the tolerable range C, D and the case of greater than the tolerable range C, D are used, and the information of the kind of abnormality corresponding to these cases is stored in the memory module 70. This relationship between the deviation and the kind of abnormality is merely an example, and finer information may be obtained by experiments, etc., and this information may be stored in the memory module 70.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection apparatus comprising:
    a disposition section on which an inspection object to be inspected is disposed;
    a vibration detector configured to output a signal corresponding to vibration of the inspection object;
    a determination module configured to determine presence/absence of abnormality of the inspection object, based on an output result of the vibration detector, and configured to Fourier-transform an output result of the vibration detector at a time when the inspection object is disposed on the disposition section, to create vibration information indicative of vibration power of a characteristic frequency of each of structural elements of the disposition section, and to determine presence/absence of abnormality of the inspection apparatus, based on the vibration information; and
    a transmission module configured to transmit an output signal of the vibration detector to the determination module,
    wherein the determination module is configured to compare the vibration power of the vibration information and a threshold which is preset, to determine that no abnormality is present in the vibration detector or the transmission module if the vibration power of the vibration information is the threshold or more, and to determine that abnormality is present in the vibration detector or the transmission module if the vibration power of the vibration information is less than the threshold.

2. The inspection apparatus of claim 1, wherein the determination module is configured to determine the presence/absence of abnormality of each of the structural elements, based on a deviation of the characteristic frequency indicated by the vibration information, relative to the characteristic frequency in a reference normal state of each of the structural elements of the disposition section.

3. The inspection apparatus of claim 2, wherein the determination module is configured to determine that each of the structural elements of the disposition section is normal if the deviation of the characteristic frequency indicated by the vibration information, relative to the characteristic frequency in the reference normal state of each of the structural elements is within a tolerable range which is preset for each of the structural elements, and to determine that each of the structural elements of the disposition section is abnormal if the deviation of the characteristic frequency is out of the tolerable range.

4. The inspection apparatus of claim 1, wherein the determination module is configured to determine a kind of abnormality, based on a deviation amount of the characteristic frequency indicated by the vibration information, relative to the characteristic frequency in a reference normal state of each of the structural elements of the disposition section.

5. An abnormality detection method of detecting abnormality of an inspection apparatus comprising a disposition section on which an inspection object to be inspected is disposed, a vibration detector configured to output a signal corresponding to vibration of the inspection object, a determination module configured to determine presence/absence of abnormality of the inspection object, based on an output result of the vibration detector, and a transmission module configured to transmit an output signal of the vibration detector to the determination module, the method comprising:
    Fourier-transforming an output result of the vibration detector at a time when the inspection object is disposed on the disposition section, and creating vibration information indicative of vibration power of a characteristic frequency of each of structural elements of the disposition section;
    determining presence/absence of abnormality of the inspection apparatus, based on the vibration information;
    comparing the vibration power of the vibration information and a threshold which is preset; and
    determining that no abnormality is present in the vibration detector or the transmission module if the vibration power of the vibration information is the threshold or more, and determining that abnormality is present in the vibration detector or the transmission module if the vibration power of the vibration information is less than the threshold.

6. The abnormality detection method of claim 5, further comprising determining the presence/absence of abnormality of each of the structural elements, based on a deviation of the characteristic frequency indicated by the vibration information, relative to the characteristic frequency in a reference normal state of each of the structural elements of the disposition section.

7. The abnormality detection method of claim 6, further comprising determining that each of the structural elements of the disposition section is normal if the deviation of the characteristic frequency indicated by the vibration information, relative to the characteristic frequency in the reference normal state of each of the structural elements is within a tolerable range which is preset for each of the structural elements, and determining that each of the structural elements of the disposition section is abnormal if the deviation of the characteristic frequency is out of the tolerable range.

8. The abnormality detection method of claim 5, further comprising determining a kind of abnormality, based on a deviation amount of the characteristic frequency indicated by the vibration information, relative to the characteristic frequency in a reference normal state of each of the structural elements of the disposition section.

* * * * *